June 24, 1930. H. PARKER 1,765,999
BRANCH CONNECTER FOR FIBROUS CONDUITS
Filed July 14, 1925 2 Sheets-Sheet 1
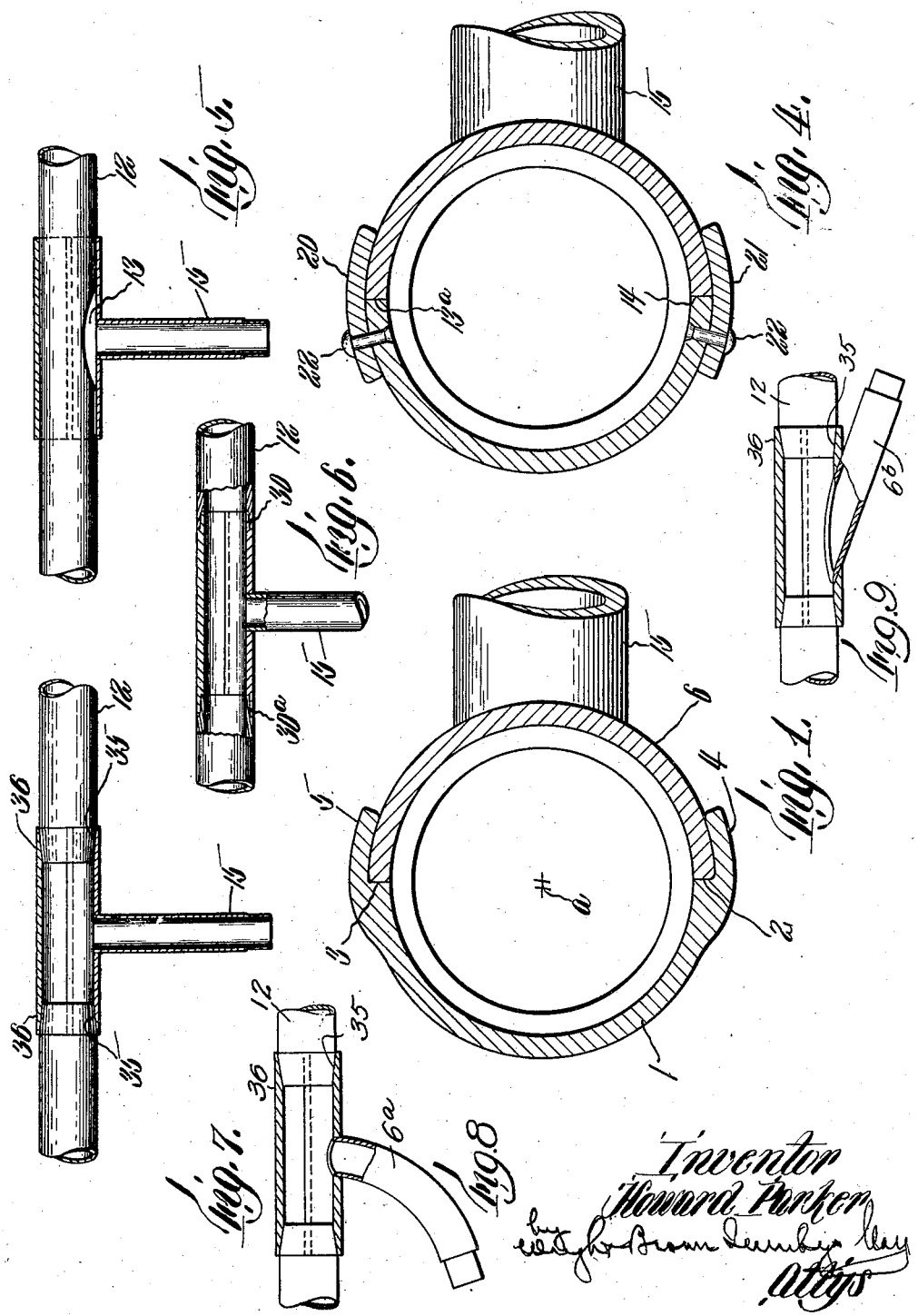

June 24, 1930.　　　H. PARKER　　　1,765,999
BRANCH CONNECTER FOR FIBROUS CONDUITS
Filed July 14, 1925　　2 Sheets-Sheet 2
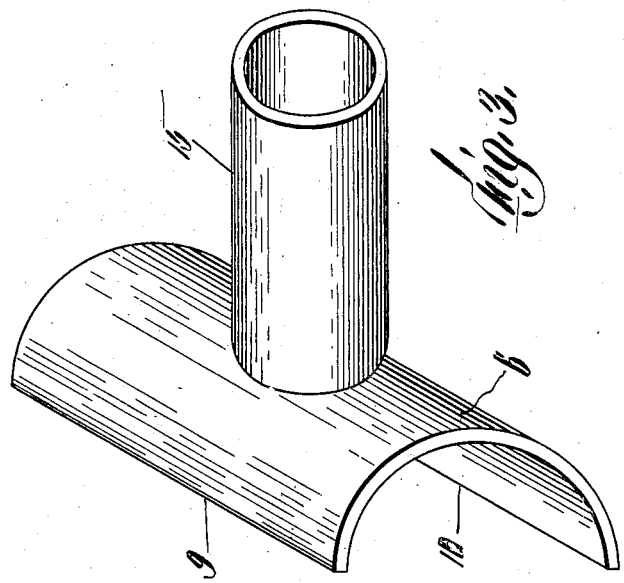
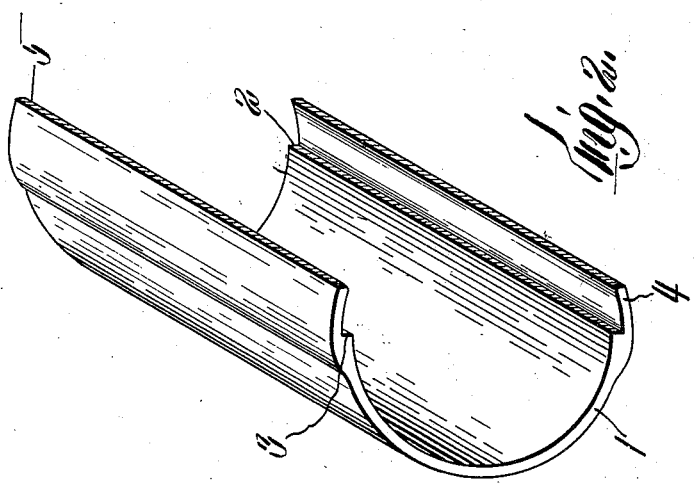
Inventor
Howard Parker

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

BRANCH CONNECTER FOR FIBROUS CONDUITS

Application filed July 14, 1925. Serial No. 43,601.

This invention relates to branch connecters for conduits, and is more particularly concerned with connecters made of fibrous material and adapted for use with cylindrical conduits of the same material.

Such conduits or tubes may be formed by winding a web of cellulose pulp or a sheet of paper on a mandrel until a tube having a wall of the desired thickness has been formed, then removing the tube from the mandrel and thoroughly drying it. When used as a conduit or closure for electric wiring or as a water pipe, the tube may be waterproofed and rendered electro-insulating, as by impregnating or saturating it with pitch or other suitable material.

When such conduits are employed in practice, as in electric wiring systems, it frequently occurs that it is necessary to make branch connections from the main conduit after a system has already been laid. Since such systems are usually buried in the ground, in making branch connections with the usual types of branch connecters, as for example a T or a +, it would ordinarily be necessary to disconnect or remove certain conduits from the system and make changes in the removed conduits prior to the insertion of the branch connecter into the line. In such cases, the conduits must be dug out from the ground or removed from the tiled trench and then replaced or buried in the ground, such procedure necessarily being time-consuming and expensive. Hence the primary object of the present invention is to provide a branch connecter which may be joined on to any portion of an underground conduit system without the necessity for the removal or disconnection of any conduit unit from the system.

This object is attained in a sectional connecter which may for convenience of designation be termed a "snap joint" connecter. The connecter in general construction consists of two complemental semi-tubular sections, either or both of which may be provided with branch conduits, or with an opening for the insertion of a branch conduit, and which are adapted to be united or mated to form a unit tubular connecter. One of the sections has curved lapping members forming ledges or seats with the longitudinal side edges of that section. The inner surfaces or faces of the lapping members are of a cylindrical curvature equal to the outer curvature of the semi-tubular sections, and the central axis of the curved surfaces is preferably located in a position such that if its semi-tubular section were completed to form a tube, the extension members would intersect such a complete tube. In other words, the lapping members are preferably slightly eccentric in reference to the tubular body portion so as to exert a spring action against the other section which they are adapted to lap. The sections, as stated, are somewhat springy or resilient, and may be assembled by forcing them together so that the side edges of one section rest on the seat of the section provided with the lapping members, which ensures their union.

On the accompanying drawings, which when taken in conjunction with the following description give a more complete understanding of the present invention, Figure 1 illustrates a section taken through a branch connecter constructed according to the present invention in assembled condition.

Figures 2 and 3 show in perspective a connecter separated into its component sections, respectively showing the section provided with the lapping members and the section complemental thereto.

Figure 4 shows in a sectional view similar to Figure 1 a somewhat modified type of assembly.

Figure 5 illustrates one method of connecting the branch connecter shown in Figures 1 to 3 with a conduit.

Figures 6 to 9, inclusive, illustrate other methods of joining the connecter to a conduit.

Referring to the drawings, the connecter illustrated in Figure 1 consists of the two semi-tubular sections shown in detail in Figures 2 and 3. The section shown in Figure 2 consists of a semi-tubular wall 1, having a pair of lapping members 4, 5, of cylindrical curvature, forming with the longitudinal edges of the section respectively the ledges or seats 2 and 3. The members 4 and 5 are of an inside diameter sufficient to permit lapping of the semi-tubular section 6, and the ledges 2 and 3 of the section 1 are complemental to the side edges 9 and 10 of the section 6 shown in Figure 3. The location of the central axis of the members 4 and 5 (as shown in Figure 1 at a) and the width of the members preferably are such that if the semi-tubular surface were completed to form a tube, the members would intersect the complete tube. However, the longitudinal edges of the member need only be separated a sufficient distance to permit the edges to be sprung apart and snapped over the section 6 without being permanently deformed or cracked. Consequently when the two sections are snapped together, the lapping members exert a spring action to keep the two sections together and ensure their union. This is due to the inherent springiness or resiliency of the material.

Either one or both the sections may be provided with openings for the insertion of a branch conduit as indicated in Figure 3. For example, a hole may be suitably formed in the member 6, in which a fibrous conduit 15 may be inserted and fastened thereto by suitable binding means as asphalt or cement. The conduit 15 is preferably inserted in the member 6 in the shop, but it will of course be understood that the insertion may be made on the job.

In Figure 5 I have illustrated a method of assembling a branch connecter of the type described for instance with a main conduit in an underground system, and at 12 I have indicated that portion of a main conduit of indefinite length in which it is desired to insert a branch connection. The main conduit is accordingly broken into at the point in the conduit at which the branch connection is to be established, and the desired size of opening is made as indicated by a hole 13. The branch connecter employed for the purpose is of an inside diameter equal to the outside diameter of the conduit 12. In making the connection, the semi-tubular section 1 of the connecter is applied over the wall of the conduit 12, diametrically opposite to the hole 13. The other semi-tubular section 6, with or without a branch conduit inserted therein, is snapped into position, its edges 9 and 10 resting on the seats 2 and 3 of its complemental section, with the lapping members 4 and 5 lapping or embracing a portion of its outer surface and maintaining the union between the sections. Preferably asphalt, cement, or any other suitable binder, is applied between the surfaces of contact of the sections and between the conduit 12 and the sections. A branch conduit 15 is now inserted by forcing into the opening in the section 6 and is preferably fastened thereto as by a suitable binder, if not already fastened thereto.

In place of the construction described in Figure 1, I may employ a connecter of the construction shown in Figure 4. According to this construction, the lapping members 20 and 21 consist of longitudinal sections of a tube of an inside diameter equal to the outside diameter of the sections, suitably fastened as by rivets 22 near the edges 13ª and 14 of one of the sections, the inner surface of the members 20 and 21 and the longitudinal edges 13ª and 14 constituting a seat for the reception of the other semi-tubular section. The members are preferably fastened to the semi-tubular section in the shop before its impregnation with a waterproofing compound, such as pitch, which after setting binds the section and the members firmly together and serves as a moisture-proof seal. The two sections are assembled with a conduit, as has already been described in connection with the construction shown in Figures 1 to 3.

In place of applying the branch connecter over a conduit as illustrated in Figure 5, a branch connection may be made by breaking the conduit in two at the desired location for a sufficient portion of its length, forming the desired type of joint at the ends formed by such a break and at the ends of the connecter sections by any suitable tool or instrumentality, and finally assembling the connecter with the ends of the broken conduit.

In Figure 6 as illustrated a type of connecter which may be assembled with the ends of a broken conduit and which may be termed a "socket joint connecter." As shown in this figure, the connecter is of a diameter equal to the diameter of the broken conduit, and its ends are shaped and finished to form socket joints 30 and 30ª with the ends of the broken conduit. The connecter is equal in length to the break in the conduit and is united between the ends of the broken conduit by forcing the semi-tubular sections together, a binder preferably being applied at the areas of contact of the connecter and the conduit and on the surfaces of the socket joints.

In Figure 7 I have illustrated another form of "connection" which may be assembled with the ends of a broken conduit. This type of connecter, which may be termed a "drive joint connecter" is assembled with the ends 35 of the broken main conduit being tapered and the ends 36 of the sections of the branch connecter also being tapered and complemental to the tapered ends 35 of the main conduit.

While I have shown certain preferred types of assemblies which may be made between the connecter and a main conduit, it will of course be understood that any other suitable assemblies may be made. Moreover, while I have described only straight cylindrical branch conduits as being fitted into the connecters, it will of course be understood that a curved branch conduit 6ª, as shown in Figure 8, or an inclined branch conduit 6ᵇ, as shown in Figure 9 may be employed wherever desired.

Although I preferably employ semi-tubular sections because of their simple construction and application and have described branch connecters consisting of only two sections, it should be obvious that a branch connecter may be constructed consisting of a greater plurality of sections, certain of said sections having lapping members for engaging and holding the sections complemental thereto united without the use of additional fastening or uniting means, such as straps or wires. Connecters formed of fibrous material as herein described are made waterproof if desired, and possess a certain modulus of elasticity, so that the lapping members on one section exert a gripping or spring action on the other section to maintain the sections in their snapped-together relation.

Having thus described certain embodiments of this invention, it should be evident to those skilled in the art that these are capable of changes and modifications which lie within the spirit and scope of this invention as defined by the appended claims.

What I claim is:

1. A fibrous branch connecter adapted for use in connection with cylindrical fibrous conduits consisting of a pair of substantially semi-tubular resilient sections adapted together to form a unit tubular connecter, one of said sections having curved lapping members forming ledges with the longitudinal side edges of that section and of an inside diameter equal to the outside diameter of the sections, said lapping members being eccentric in reference to their semi-tubular sections, so as to exert a spring action against the section over which they lap.

2. A fibrous branch connecter adapted for use with cylindrical fibrous conduits, said connecter comprising a pair of complemental resilient and substantially semi-tubular sections, one of said sections having curved lapping members of an inside diameter sufficient to permit lapping of the other section, the longitudinal edges of said members being separated a sufficient distance to permit the said edges to be sprung apart and snap over the other section without being permanently deformed or cracked, and the ends of the connecter being formed to mate with the ends of the conduits with which it is used.

3. A fibrous branch connecter adapted for use with cylindrical fibrous conduits, said connecter comprising a pair of complemental, resilient, and substantially semi-tubular sections, one of said sections having curved lapping members of an inside diameter sufficient to permit lapping of the other section and forming seats with the longitudinal side edges of said section complemental to the longitudinal side edges of said other section, the longitudinal edges of said members being separated a sufficient distance to permit the said edges to be sprung apart and to snap over the other section without being permanently deformed or cracked.

In testimony whereof I have affixed my signature.

HOWARD PARKER.